United States Patent
Clarke et al.

(10) Patent No.: US 9,129,513 B1
(45) Date of Patent: Sep. 8, 2015

(54) FLOOR MAT SYSTEM

(71) Applicants: Ronald P. Clarke, Laguna Woods, CA (US); Beverley A. Clarke, Laguna Woods, CA (US); Stefanie L. McPherson, St. Louis, MO (US)

(72) Inventors: Ronald P. Clarke, Laguna Woods, CA (US); Beverley A. Clarke, Laguna Woods, CA (US); Stefanie L. McPherson, St. Louis, MO (US)

(*) Notice: Subject to any disclaimer, the term of this patent is extended or adjusted under 35 U.S.C. 154(b) by 253 days.

(21) Appl. No.: 13/955,544

(22) Filed: Jul. 31, 2013

(51) Int. Cl.
*G05B 11/01* (2006.01)
*G08C 17/02* (2006.01)
*G01L 5/22* (2006.01)
*G08C 17/00* (2006.01)

(52) U.S. Cl.
CPC ............... *G08C 17/02* (2013.01); *G01L 5/228* (2013.01); *G08C 17/00* (2013.01)

(58) Field of Classification Search
CPC ... G06F 3/0219; H04M 1/7253; G08C 17/02; G08C 17/00; B60R 25/24; B64D 11/0015; G01L 5/228
USPC .................................................... 73/862.046
See application file for complete search history.

(56) References Cited

U.S. PATENT DOCUMENTS

| | | | |
|---|---|---|---|
| 4,841,587 A | 6/1989 | Carter et al. | |
| 5,210,528 A | 5/1993 | Schulman et al. | |
| 5,234,212 A * | 8/1993 | Dutra, Jr. | 271/207 |
| 5,264,824 A | 11/1993 | Hour | |
| D350,253 S | 9/1994 | Livingstone et al. | |
| D352,630 S | 11/1994 | Yamanaka | |
| 6,144,306 A | 11/2000 | Huang | |
| 6,155,120 A * | 12/2000 | Taylor | 73/862.046 |
| 6,233,776 B1 * | 5/2001 | Blum et al. | 15/215 |
| 6,549,502 B1 * | 4/2003 | Lagasse | 369/63 |
| 7,436,325 B2 * | 10/2008 | Bailey | 341/20 |
| 7,619,543 B1 * | 11/2009 | Todinca | 340/932.2 |
| 2005/0087143 A1 | 4/2005 | Doran | |
| 2007/0094784 A1 * | 5/2007 | Tran | 4/541.5 |
| 2010/0109879 A1 * | 5/2010 | Hamdan | 340/573.4 |

* cited by examiner

*Primary Examiner* — Jennifer Mehmood
*Assistant Examiner* — Yong Hang Jiang

(57) ABSTRACT

A floor mat system features a mat base. A mat top surface is designed to interface with a foot or a shoe sole of a user, and a mat bottom surface is designed to interface with a ground surface. The system features a microprocessor operatively connected to a power source. The microprocessor and the power source are located in the mat base. The system features a pressure sensor located in the mat base operatively connected to the microprocessor. The system features a transmitter located in the mat base operatively connected to the microprocessor. The transmitter is designed to operatively communicate with a remote receiver.

12 Claims, 4 Drawing Sheets

FLOOR MAT SYSTEM

FIELD OF THE INVENTION

The present invention relates to floor mats, or more specifically, floor mats having integrated interaction and control features.

BACKGROUND OF THE INVENTION

Floor mats are often used in homes and offices for ensuring a bottom of a foot or shoe is relatively clean before proceeding past the mat. The present invention features a floor mat system for effective interaction with a user.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a floor mat system for effective interaction with a user. In some embodiments, the system comprises a mat base. In some embodiments, a mat top surface is designed to interface with a foot or shoe sole of the user. In some embodiments, a mat bottom surface is designed to interface with a ground surface.

In some embodiments, the system comprises a microprocessor operatively connected to a power source. In some embodiments, the microprocessor and the power source are located in the mat base. In some embodiments, the system comprises a pressure sensor operatively connected to the microprocessor. In some embodiments, a pressure sensor first strip, a pressure sensor second strip, and a pressure sensor third strip intersect and operatively connect at a point close to an intersection of a mat first edge and a mat anterior edge in the mat base.

In some embodiments, the system comprises a transmitter operatively connected to the microprocessor. In some embodiments, the transmitter is located in the mat base. In some embodiments, the transmitter is designed to operatively communicate with a remote receiver. In some embodiments, the user places the foot upon the mat top surface. In some embodiments, the system is activated via the pressure sensor.

DESCRIPTION OF PREFERRED EMBODIMENTS

Figure 1:
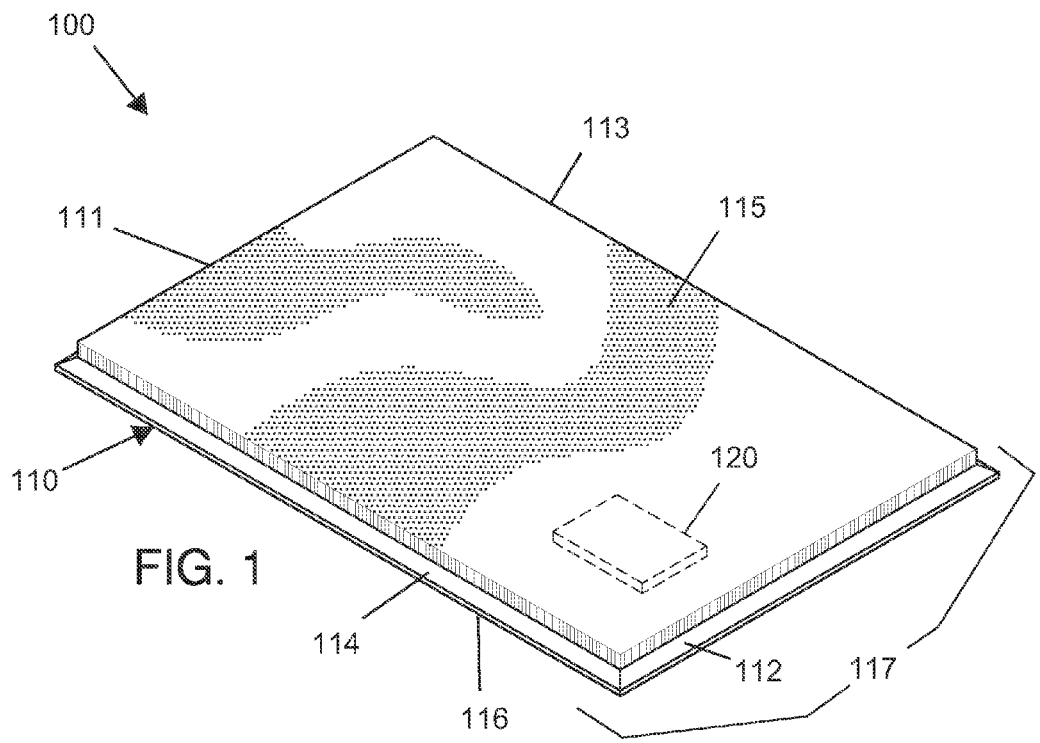
FIG. 1 shows a perspective view of the present invention.
Figure 2:
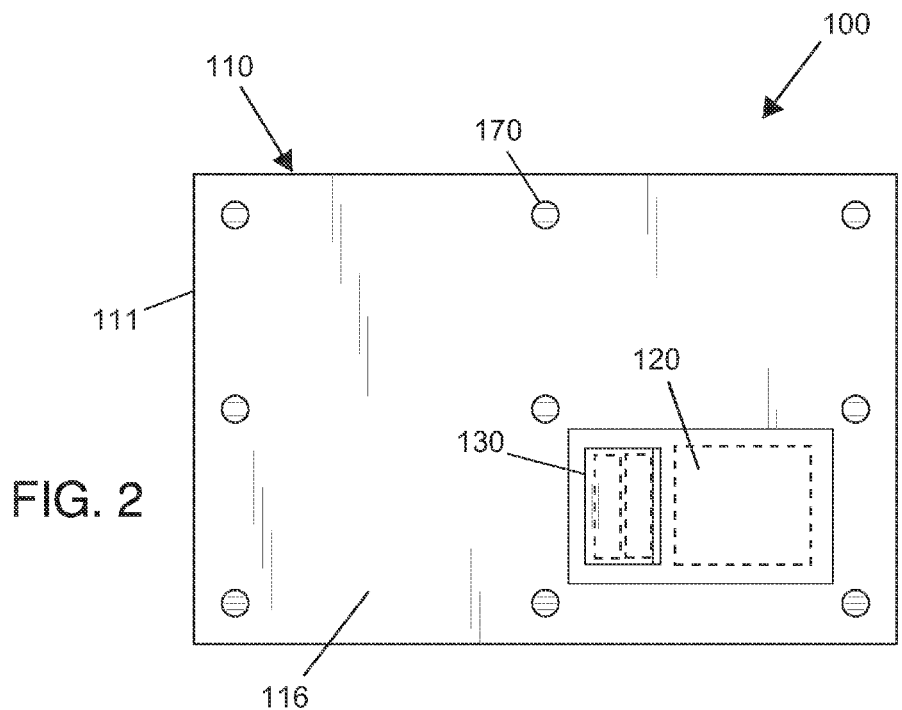
FIG. 2 shows a bottom view of the present invention.
Figure 3:
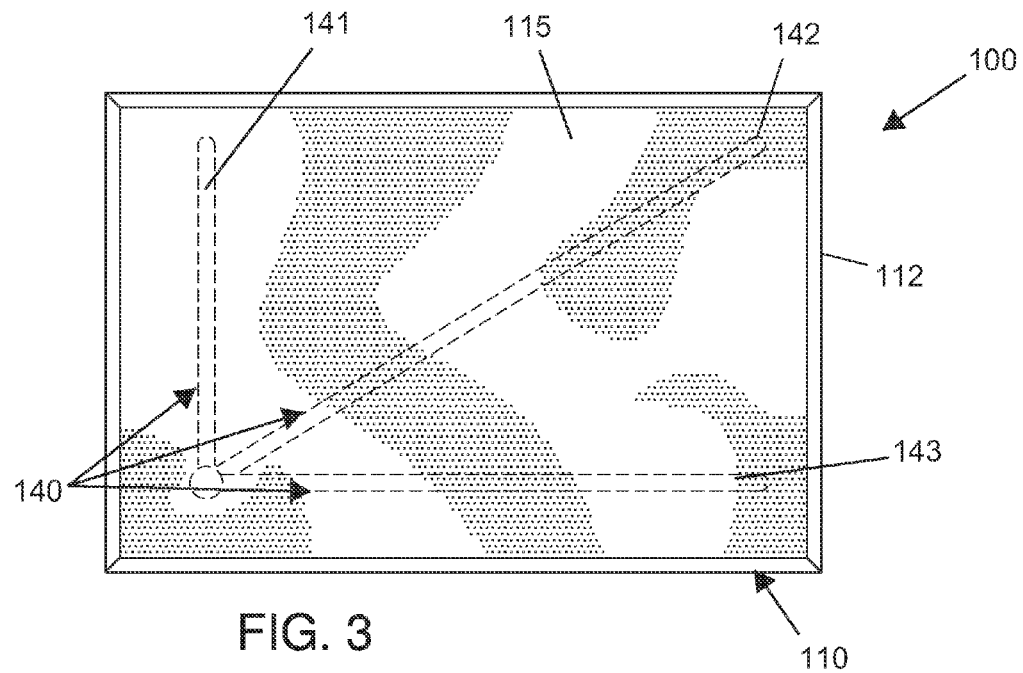
FIG. 3 shows a top view of the present invention.
Figure 4:
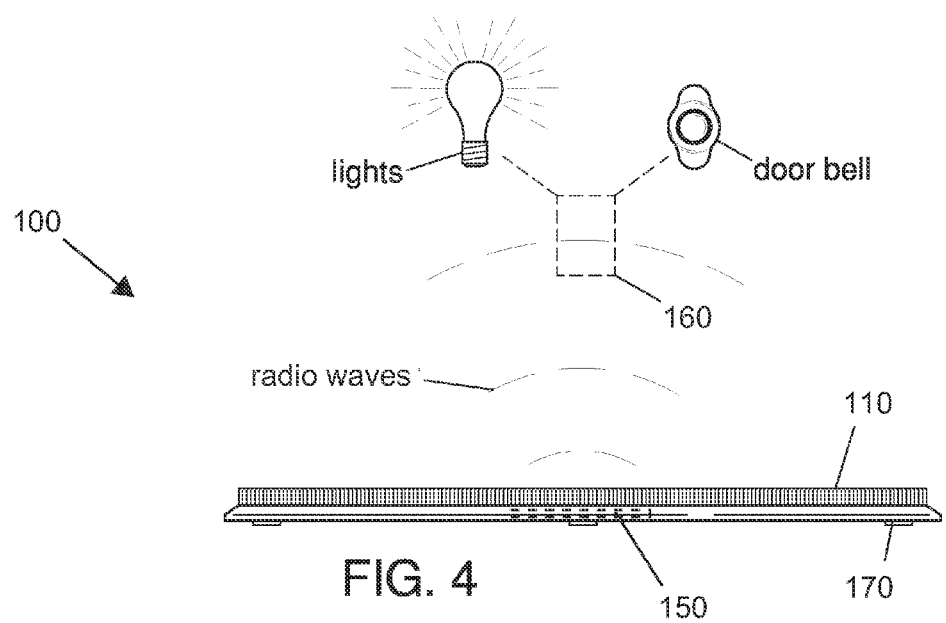
FIG. 4 shows a side view of the present invention.
Figure 5:
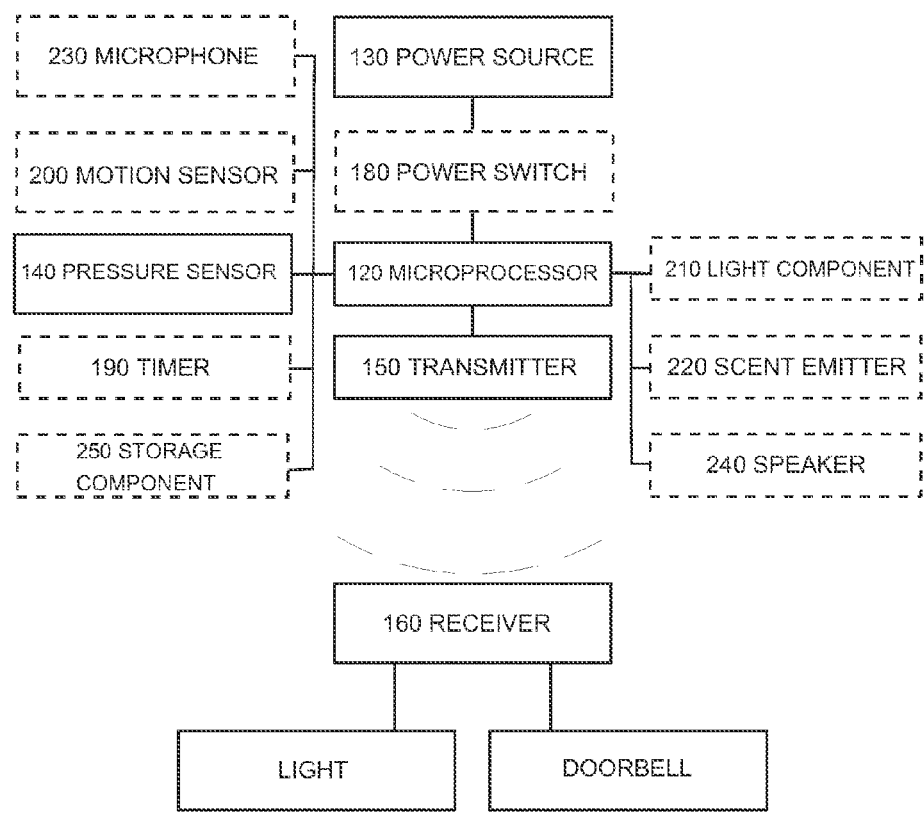
FIG. 5 shows a schematic view of the present invention.
Figure 6:
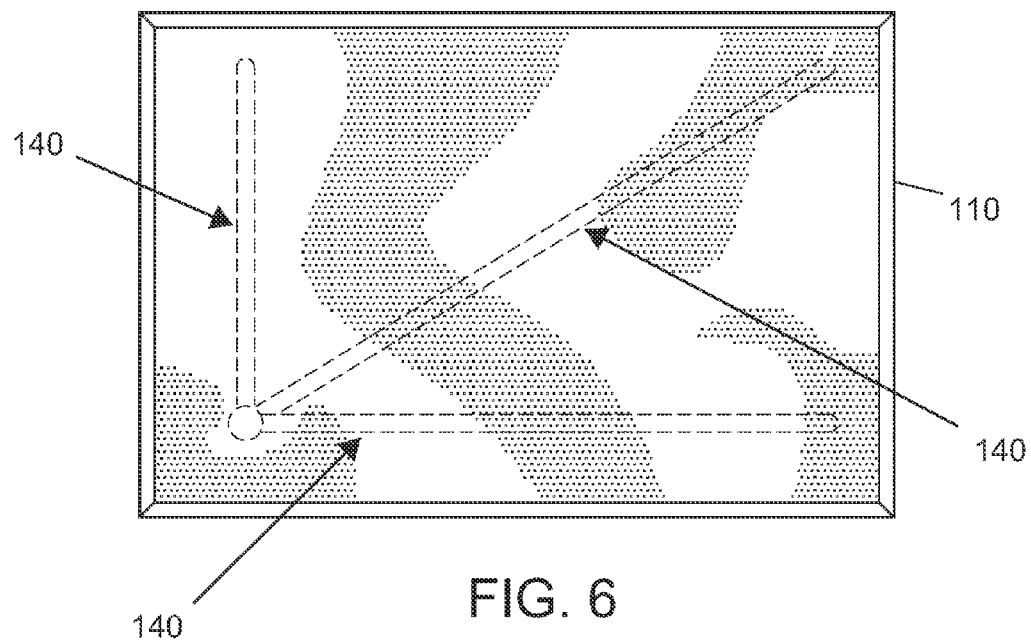
FIG. 6 shows alternate embodiments of the pressure sensor of the present invention.

Following is a list of elements corresponding to a particular element referred to herein:
100 Floor mat system
110 Mat base
111 Mat first edge
112 Mat second edge
113 Mat posterior edge
114 Mat anterior edge
115 Mat top surface
116 Mat bottom surface
117 Mat outer periphery
120 Microprocessor
130 Power source
140 Pressure sensor
141 Pressure sensor first strip
142 Pressure sensor second strip
143 Pressure sensor third strip
150 Transmitter
160 Receiver
170 Footing component
180 Power switch
190 Timer
200 Motion sensor
210 Light component
220 Scent emitter
230 Microphone
240 Speaker
250 Storage component Referring now to FIG. 1-6, the present invention features a floor mat system (100) for effective interaction with a user. In some embodiments, the system (100) comprises a mat base (110) having a mat first edge (111), an opposing mat second edge (112), a mat posterior edge (113), a mat anterior edge (114), a mat top surface (115) and a mat bottom surface (116). In some embodiments, the mat top surface (115) is designed to interface with a foot or a shoe sole of the user. In some embodiments, the mat bottom surface (116) is designed to interface with a ground surface.

In some embodiments, the system (100) comprises a microprocessor (120) operatively connected to a power source (130). In some embodiments, the microprocessor (120) and the power source (130) are located in the mat base (110). In some embodiments, the power source (130) is a battery located in a battery compartment.

In some embodiments, the system (100) comprises a pressure sensor (140) operatively connected to the microprocessor (120). In some embodiments, the pressure sensor (140) comprises a linear pressure sensor first strip (141) located in the mat base (110) close to and parallel with the mat first edge (111). In some embodiments, the pressure sensor (140) comprises a linear pressure sensor second strip (142) located in the mat base (110). In some embodiments, the pressure sensor second strip (142) has a first end located close to an intersection of the mat first edge (111) and the mat anterior edge (114) and a second terminating end located close to an intersection of the mat second edge (112) and the mat posterior edge (113). In some embodiments, the pressure sensor second strip (142) traverses the mat base (110) diagonally. In some embodiments, the pressure sensor (140) comprises a linear pressure sensor third strip (143) located close to and parallel with the mat close edge. In some embodiments, the pressure sensor first strip (141), the pressure sensor second strip (142), and the pressure sensor third strip (143) intersect and operatively connect at a point close to the intersection of the mat first edge (111) and the mat anterior edge (114). In some embodiments, the pressure sensor (140) detects when the user stands almost anywhere on the mat base (110).

In some embodiments, the system (100) comprises a transmitter (150) operatively connected to the microprocessor (120). In some embodiments, the transmitter (150) is located in the mat base (110). In some embodiments, the transmitter (150) is designed to operatively communicate with a remote receiver (160). In some embodiments, the transmitter uses Bluetooth™ wireless technology or wireless transmission of waves via radio frequency.

In some embodiments, the user places the foot upon the mat top surface (115). In some embodiments, the system (100) is activated via the pressure sensor (140). In some embodiments, when the user places the foot upon the mat top surface (115), the system (100) is activated via the pressure sensor (140) sending a first activation signal to the microprocessor (120). In some embodiments, the microprocessor sends a second activation signal to the transmitter (150). In some embodiments, the transmitter sends a third wireless activation signal to the remote receiver (160). In some embodiments, the remote receiver sends a fourth signal to activate an appliance.

In some embodiments, the mat bottom surface (116) comprises a plurality of nonslip footing components (170) located thereon around a mat outer periphery (117). In some embodiments, a nonslip footing component (170) is located in a center of the mat base (110). In some embodiments, the nonslip footing component (170) elevates the mat base (110) from the ground surface so as to avoid trapping water thereunder. In some embodiments, the mat base (110) is elevated ⅟₁₆". In some embodiments, the mat base (110) is elevated ⅛". In some embodiments, the mat base (110) is elevated ³⁄₁₆".

In some embodiments, a power switch (180) is operatively connected to the microprocessor (120). In some embodiments, the power switch (180) isolates or operatively connects the power source (130) to the microprocessor (120).

In some embodiments, a timer (190) is operatively connected to or embedded within the microprocessor (120). In some embodiments, the timer (190) is configured to stop activation of a programmed sequence initiated by the microprocessor (120) after a predetermined time limit. In some embodiments, the timer (190) is a program.

In some embodiments, a motion sensor (200) is operatively connected to the microprocessor (120). In some embodiments, the motion sensor (200) is located on the mat top surface (115). In some embodiments, the motion sensor (200) activates the microprocessor (120) in the same manner as the pressure sensor (140). In some embodiments, the motion sensor is located in a mat top surface (115). In some embodiments, the motion sensor activates the microprocessor (120) via a fifth signal.

In some embodiments, a plurality of light components (210) is operatively connected to the microprocessor (120). In some embodiments, the light components (210) are located around a mat outer periphery (117) of the mat base (110), on the mat top surface (115), or a combination thereof. In some embodiments, the light components (210) are light emitting diodes. In some embodiments, the light components (210) are colored. In some embodiments, the light components (210) light up and alternatingly flash based on a predetermined programming sequence in the microprocessor (120). In some embodiments, the light components (210) are disposed on the mat top surface (115) and sequentially combine to form a design or spell out a word or a message. In some embodiments, the plurality of light components is activated via the pressure sensor (140) sending a first activation signal to the microprocessor (120). In some embodiments, the microprocessor sends a sixth activation signal to the plurality of light components (210).

In some embodiments, a scent emitter (220) is operatively connected to the microprocessor (120). In some embodiments, the scent emitter (220) is located in the mat base (110). In some embodiments, a scent is released by the scent emitter (220) via the microprocessor (120). In some embodiments, the scent emitter (220) is refillable. In some embodiments, the scent emitter (220) is activated via the pressure sensor (140) sending a first activation signal to the microprocessor (120). In some embodiments, the microprocessor sends a seventh activation signal to the scent emitter (220) for releasing a scent in an area surrounding the mat base (110).

In some embodiments, the remote receiver (160) activates a doorbell via an eighth signal. In some embodiments, the remote receiver (160) activates a light via an eighth signal. In some embodiments, the remote receiver (160) activates an appliance. In some embodiments, multiple remote receivers (160) are activated via the transmitter (150).

In some embodiments, the microprocessor (120) is programmable. In some embodiments, the microprocessor (120) is wirelessly programmable. In some embodiments, a program (a predetermined sequence for lighting, sounds, etc.) is loaded to the microprocessor via an operatively connected universal serial bus port disposed in the mat base (110).

In some embodiments, the system (100) comprises a microphone (230) operatively connected to the microprocessor (120). In some embodiments, a sound or a message may be recorded via the microphone (230) and the microprocessor (120). In some embodiments, the sound or the message may be stored via a storage component (250) operatively connected to the microprocessor (120).

In some embodiments, a speaker (240) is operatively connected to the microprocessor (120) and located in the mat base (110). In some embodiments, the speaker (240) may play a jingle, a song, a prerecorded message, or a custom recorded message captured via the microphone (230) upon activation of the microprocessor (120) via the pressure sensor (140) or the motion sensor (200).

In some embodiments, light component (210) colorings, light component (210) flashing sequences, jingles, songs, or prerecorded messages may have a holiday, seasonal, special occasion, sports, military, company, novelty, personal, or entertainment theme. In some embodiments, holiday, seasonal, special occasion, sports, military, company, novelty, personal, or entertainment themes are reflected in one or more programs stored in the microprocessor (120) or the storage component (250).

In some embodiments, the system (100) reflects a holiday, seasonal, special occasion, sports, military, company, novelty, personal, or entertainment theme in the shape, size, coloring, and decor of the mat base (110).

In some embodiments, the system (100) comprises a mat base (110) having a mat first edge (111), an opposing mat second edge (112), a mat posterior edge (113), a mat anterior edge (114), a mat top surface (115), and a mat bottom surface (116). In some embodiments, the mat top surface (115) is designed to interface with a foot or a shoe sole of the user. In some embodiments, the mat bottom surface (116) is designed to interface with a ground surface.

In some embodiments, the system (100) comprises a microprocessor (120) operatively connected to a power source (130). In some embodiments, the microprocessor (120) and the power source (130) are disposed in the mat base (110).

In some embodiments, the system (100) comprises a linear pressure sensor (140) operatively connected to the microprocessor (120). In some embodiments, the pressure sensor (140) is disposed in the mat base (110).

In some embodiments, the system (100) comprises a transmitter (150) operatively connected to the microprocessor (120). In some embodiments, the transmitter (150) is disposed in the mat base (110). In some embodiments, the transmitter (150) is designed to operatively communicate with a remote receiver (160).

In some embodiments, when the user places the foot upon the mat top surface (115), the system (100) is activated via the pressure sensor (140) sending a first activation signal to the microprocessor (120). In some embodiments, upon receiving the first activation signal, the microprocessor sends a second activation signal to the transmitter (150). In some embodiments, upon receiving the second activation signal, the transmitter sends a third wireless activation signal to the remote receiver (160). In some embodiments, upon receiving the third wireless activation signal, the remote receiver (160) sends a fourth signal to activate an appliance.

In some embodiments, the pressure sensor (140) is disposed proximal to and parallel with the mat first edge (111) or the mat second edge (112). In some embodiments, the pressure sensor (140) is disposed parallel with the mat first edge (111) or the mat second edge (112) across a middle of the mat base (110).

In some embodiments, the pressure sensor (140) has a first end disposed proximal to an intersection of the mat first edge (111) and the mat anterior edge (114) and a second end disposed proximal to an intersection of the mat second edge (112) and the mat posterior edge (113). In some embodiments, the pressure sensor (140) has a first end disposed proximal to an intersection of the mat second edge (112) and the mat anterior edge (114) and a second end disposed proximal to an intersection of the mat first edge (111) and the mat posterior edge (113). In some embodiments, the pressure sensor (140) traverses the mat base (110) diagonally.

In some embodiments, the pressure sensor (140) is disposed proximal to and parallel with the mat anterior edge (114) or the mat posterior edge (113). In some embodiments, the pressure sensor (140) is disposed parallel with the mat anterior edge (114) or the mat posterior edge (113) across the middle of the mat base (110).

As used herein, the term "about" refers to plus or minus 10% of the referenced number.

The disclosures of the following U.S. patents are incorporated in their entirety by reference herein: U.S. Pat. No. D 352,630; U.S. Pat. No. D 350,253; U.S. Patent Pub. No. 2005/0087143; U.S. Pat. No. 6,549,502; U.S. Pat. No. 6,144,306; U.S. Pat. No. 5,264,824; U.S. Pat. No. 5,210,528; and U.S. Pat. No. 4,841,587.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A floor mat system (100) for effective interaction with a user, wherein the system (100) comprises:
    (a) a mat base (110) having a mat first edge (111), an opposing mat second edge (112), a mat posterior edge (113), a mat anterior edge (114), a mat top surface (115), and a mat bottom surface (116), wherein the mat top surface (115) is designed to interface with a foot or a shoe sole of the user, wherein the mat bottom surface (116) is designed to interface with a ground surface;
    (b) a microprocessor (120) operatively connected to a power source (130), wherein the microprocessor (120) and the power source (130) are disposed in the mat base (110);
    (c) a pressure sensor (140) operatively connected to the microprocessor (120),
wherein the pressure sensor (140) comprises a linear pressure sensor first strip (141) disposed in the mat base (110) proximal to and parallel with the mat first edge (111),
wherein the pressure sensor (140) comprises a linear pressure sensor second strip (142) disposed in the mat base (110),
wherein the pressure sensor second strip (142) has a first end disposed proximal to an intersection of the mat first edge (111) and the mat anterior edge (114) and a second terminating end disposed proximal to an intersection of the mat second edge (112) and the mat posterior edge (113), wherein the pressure sensor second strip (142) traverses the mat base (110) diagonally,
wherein the pressure sensor (140) comprises a linear pressure sensor third strip (143) disposed proximal to and parallel with the mat anterior edge (114),
wherein the pressure sensor first strip (141), the pressure sensor second strip (142), and the pressure sensor third strip (143) intersect and operatively connect at a point proximal to the intersection of the mat first edge (111) and the mat anterior edge (114); and
    (d) a transmitter (150) operatively connected to the microprocessor (120), wherein the transmitter (150) is disposed in the mat base (110), wherein the transmitter (150) is designed to operatively communicate with a remote receiver (160);
wherein when the user places the foot upon the mat top surface (115), the system (100) is activated via the pressure sensor (140) sending a first activation signal to the microprocessor (120), wherein upon receiving the first activation signal, the microprocessor sends a second activation signal to the transmitter (150), wherein upon receiving the second activation signal, the transmitter sends a third wireless activation signal to the remote receiver (160), wherein upon receiving the third wireless activation signal, the remote receiver (160) sends a fourth signal to activate an appliance.

2. The system (100) of claim 1, wherein the mat bottom surface (116) comprises a plurality of nonslip footing components (170) disposed thereon around a mat outer periphery (117).

3. The system (100) of claim 1, wherein a power switch (180) is operatively connected to the microprocessor (120), wherein the power switch (180) isolates or operatively connects the power source (130) to the microprocessor (120).

4. The system (100) of claim 1, wherein a timer (190) is operatively connected to the microprocessor (120) for stopping activation of a programmed sequence initiated by the microprocessor (120) after a predetermined time limit.

5. The system (100) of claim 1, wherein a motion sensor (200) is operatively connected to the microprocessor (120), wherein the motion sensor (200) is disposed on the mat top surface (115), wherein the motion sensor activates the microprocessor (120) via a fifth signal.

6. The system (100) of claim 1, wherein a plurality of light components (210) is operatively connected to the microprocessor (120), wherein the light components (210) are disposed around a mat outer periphery (117), on the mat top surface (115), or a combination thereof, wherein the plurality of light components is activated via the pressure sensor (140) sending a first activation signal to the microprocessor (120), wherein the microprocessor sends a sixth activation signal to the plurality of light components (210).

7. The system (100) of claim 1, wherein a scent emitter (220) is operatively connected to the microprocessor (120), wherein the scent emitter (220) is disposed in the mat base (110), wherein the scent emitter (220) is activated via the pressure sensor (140) sending a first activation signal to the microprocessor (120), wherein the microprocessor sends a seventh activation signal to the scent emitter (220) for releasing a scent in an area surrounding the mat base (110).

8. The system (100) of claim 1, wherein the remote receiver (160) activates a doorbell via an eighth signal.

9. The system (100) of claim 1, wherein the remote receiver (160) activates a light via an eighth signal.

10. The system (100) of claim 1, wherein the microprocessor (120) is programmable.

11. The system (100) of claim 1, wherein the system (100) comprises a microphone (230) operatively connected to the microprocessor (120), wherein a sound or a message may be recorded via the microphone (230) and the microprocessor (120), wherein the sound or the message may be stored via a storage component (250) operatively connected to the microprocessor (120).

12. The system (100) of claim 1 wherein a speaker (240) is operatively connected to the microprocessor (120) and disposed in the mat base (110).

\* \* \* \* \*